(12) United States Patent
Viegas

(10) Patent No.: US 8,037,704 B2
(45) Date of Patent: Oct. 18, 2011

(54) DISTRIBUTED REFRIGERATION SYSTEM

(75) Inventor: Herman H. Viegas, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 695 days.

(21) Appl. No.: 12/125,097

(22) Filed: May 22, 2008

(65) Prior Publication Data

US 2009/0288438 A1  Nov. 26, 2009

(51) Int. Cl.
*B60H 1/32* (2006.01)
(52) U.S. Cl. .......................................... 62/239
(58) Field of Classification Search .................... 62/239, 62/371
See application file for complete search history.

(56) References Cited

U.S. PATENT DOCUMENTS

| | | |
|---|---|---|
| 2,513,679 A | 7/1950 | Ritter |
| 2,766,439 A | 10/1956 | Palm |
| 2,793,834 A | 5/1957 | Henney et al. |
| 3,848,428 A | 11/1974 | Rieter |
| 3,871,188 A | 3/1975 | Vold et al. |
| 3,885,398 A | 5/1975 | Dawkins et al. |
| 4,043,143 A | 8/1977 | Fluder et al. |
| 4,098,093 A | 7/1978 | Czyl |
| 4,132,088 A | 1/1979 | Grosskopf |
| 4,182,134 A | 1/1980 | Viegas et al. |
| 4,196,657 A | 4/1980 | Crongeyer et al. |
| 4,257,240 A | 3/1981 | Christiansen et al. |
| 4,272,967 A | 6/1981 | White et al. |
| 4,348,871 A | 9/1982 | Androff |
| 4,365,484 A | 12/1982 | Carson et al. |
| 4,507,940 A | 4/1985 | Sato et al. |
| 4,549,405 A | 10/1985 | Anderson et al. |
| 4,551,986 A | 11/1985 | Anderson et al. |
| 4,592,207 A | 6/1986 | Rummel |
| 4,607,497 A | 8/1986 | Ferdows et al. |
| 4,608,834 A | 9/1986 | Rummel |
| 4,622,831 A | 11/1986 | Grupa |
| 4,633,767 A | 1/1987 | Sain |
| 4,641,502 A | 2/1987 | Aldrich et al. |
| 4,727,728 A | 3/1988 | Brown |
| 4,732,011 A | 3/1988 | Haiya |
| 4,736,597 A | 4/1988 | Anderson et al. |
| 4,748,824 A | 6/1988 | Wakabayashi et al. |
| 4,748,825 A | 6/1988 | King |
| 4,787,215 A | 11/1988 | Bleck et al. |
| 4,811,569 A | 3/1989 | Welch et al. |
| 4,905,478 A | 3/1990 | Matsuda et al. |
| 4,926,655 A | 5/1990 | King |
| 5,005,372 A | 4/1991 | King |

(Continued)

FOREIGN PATENT DOCUMENTS

EP  1308330 B1  5/2003

(Continued)

*Primary Examiner* — Melvin Jones
(74) *Attorney, Agent, or Firm* — Michael Best & Friedrich LLP

(57) ABSTRACT

A refrigeration system configured for use with a trailer including a container having a roof, a first sidewall, and a second sidewall. The refrigeration system includes a refrigeration unit configured to couple to the trailer and operable to condition the container. The refrigeration system also includes a duct in fluid communication between the refrigeration unit and an opening in the first sidewall. The duct is configured to direct an airflow in at least one of a first direction toward the refrigeration unit and a second direction away from the refrigeration unit.

20 Claims, 5 Drawing Sheets

U.S. PATENT DOCUMENTS

| | | | |
|---|---|---|---|
| 5,046,327 A | 9/1991 | Walker et al. | |
| 5,074,122 A | 12/1991 | Babin et al. | |
| 5,123,257 A | 6/1992 | Anderson et al. | |
| 5,129,235 A | 7/1992 | Renken et al. | |
| 5,205,130 A * | 4/1993 | Pannell | 62/236 |
| 5,222,373 A | 6/1993 | Waldschmidt | |
| 5,342,238 A | 8/1994 | Segerpalm et al. | |
| 5,438,842 A | 8/1995 | Watkins et al. | |
| 5,440,894 A | 8/1995 | Schaeffer et al. | |
| 5,605,055 A | 2/1997 | Salgado | |
| 5,609,037 A | 3/1997 | Fischler | |
| 5,632,330 A | 5/1997 | Drucker et al. | |
| 5,778,692 A | 7/1998 | Gura | |
| 5,916,253 A | 6/1999 | Amr et al. | |
| 5,927,090 A | 7/1999 | Ladendorf et al. | |
| 5,960,637 A | 10/1999 | Stevens et al. | |
| 6,105,383 A | 8/2000 | Reimann et al. | |
| 6,116,037 A | 9/2000 | Burnett | |
| 6,161,609 A | 12/2000 | Ahn | |
| 6,279,334 B1 | 8/2001 | Ishikawa et al. | |
| 6,295,826 B1 | 10/2001 | Lee | |
| 6,339,934 B1 | 1/2002 | Yoon et al. | |
| 6,357,248 B1 | 3/2002 | Bongaards et al. | |
| 6,357,249 B1 | 3/2002 | Robinson et al. | |
| 6,374,626 B1 | 4/2002 | Takahashi | |
| 6,442,957 B1 | 9/2002 | Voogt et al. | |
| 6,606,875 B1 * | 8/2003 | Grand et al. | 62/239 |
| 6,742,343 B2 | 6/2004 | Matonog et al. | |
| 6,904,767 B1 | 6/2005 | Wright | |
| 6,923,111 B2 * | 8/2005 | Kiefer et al. | 99/468 |
| 6,978,630 B2 | 12/2005 | Wensink et al. | |
| 7,047,760 B1 | 5/2006 | Holman, Jr. | |
| 7,254,956 B2 | 8/2007 | Matonog et al. | |
| 2002/0026805 A1 | 3/2002 | Takahashi | |
| 2005/0155375 A1 | 7/2005 | Wensink et al. | |

FOREIGN PATENT DOCUMENTS

| | | | |
|---|---|---|---|
| JP | 1172018 A | 7/1989 | |
| JP | 10026459 A | 1/1998 | |
| JP | 10059057 A | 3/1998 | |
| JP | 2007055524 A | 3/2007 | |
| JP | 2007314080 A | 12/2007 | |
| RU | 1483807 A1 | 11/1996 | |
| WO | 0065288 | 11/2000 | |

* cited by examiner

DISTRIBUTED REFRIGERATION SYSTEM

BACKGROUND

The present invention relates to refrigeration systems. More particularly, the present invention relates to distributed refrigeration systems for trailers.

Large trucks (e.g., semi-tractor trailers) are commonly used to store and transport cargo, such as food product, within a trailer at a reduced or refrigerated temperature. Typically, the trailer includes a refrigeration system to maintain the cargo at the reduced temperature. One common type of refrigeration system includes a refrigeration unit having a compressor directly driven by a diesel engine and belt-driven condenser and evaporator fans. Another common type of refrigeration system includes a refrigeration unit that is electrically driven by an alternator coupled to the engine.

In either scenario, a single refrigeration unit is generally located on a front wall of a container of the trailer. The refrigeration unit typically must provide cooling to the entire container, even though some containers may be up to fifty-three feet long in trailers and seventy-two feet long in rail cars. As such, a powerful air circulation system is required to maintain a uniform temperature throughout the trailer. However, the energy required to operate the air circulation system and move air from one end of the container to another substantially reduces the overall efficiency of the refrigeration system.

In addition, if the container includes multiple compartments or portions that should be cooled to different temperatures, the complexity of the refrigeration system is greatly increased. For example, lengthy piping and additional flow control valves are commonly required to maintain different portions of the container at different temperatures, increasing the risk of refrigerant leaks and lowering the overall energy efficiency of the refrigeration system.

SUMMARY

In one embodiment, the invention provides a refrigeration system configured for use with a trailer including a container having a roof, a first sidewall, and a second sidewall. The refrigeration system includes a refrigeration unit configured to couple to the trailer and operable to condition the container. The refrigeration system also includes a duct in fluid communication between the refrigeration unit and an opening in the first sidewall. The duct is configured to direct an airflow in at least one of a first direction toward the refrigeration unit and a second direction away from the refrigeration unit.

In another embodiment, the invention provides a trailer including a container having a roof, a first sidewall, and a second sidewall. The trailer also includes a refrigeration unit operable to condition the container and a duct in fluid communication between the refrigeration unit and an opening in the first sidewall. The duct is configured to direct an airflow in at least one of a first direction toward the refrigeration unit and a second direction away from the refrigeration unit.

In yet another embodiment, the invention provides a method of conditioning a trailer. The trailer includes a container having a roof, a first sidewall, and a second sidewall. The trailer also includes a refrigeration unit. The method includes providing a first duct in fluid communication between the first refrigeration unit and an opening in the first sidewall, and a second duct in fluid communication between the refrigeration unit and an opening in the second sidewall. The method also includes directing an airflow in a first direction toward the refrigeration unit with the first duct, conditioning the container with the refrigeration unit, and directing the airflow in a second direction away from the refrigeration unit with the second duct.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
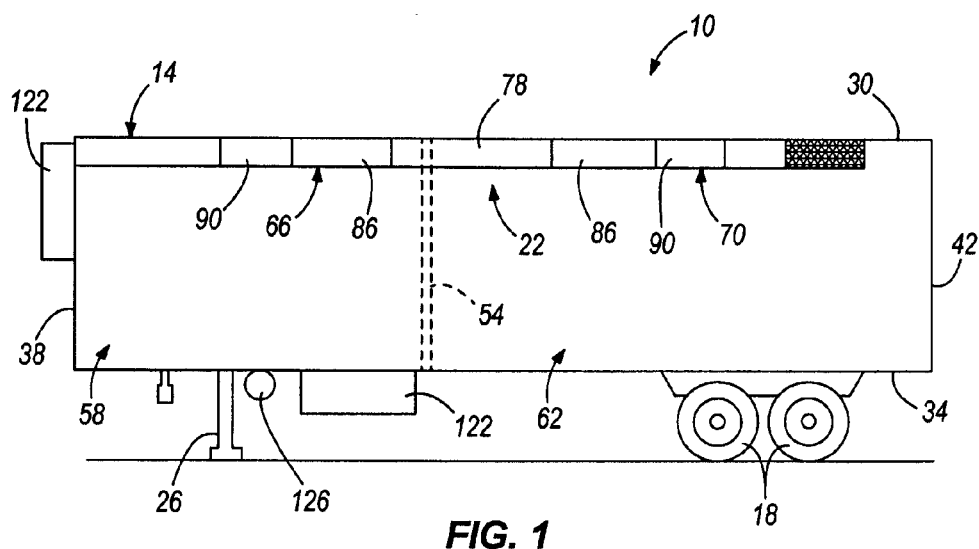
FIG. 1 is a side cross-sectional view of a trailer including a distributed refrigeration system according to an embodiment of the invention.
Figure 2:
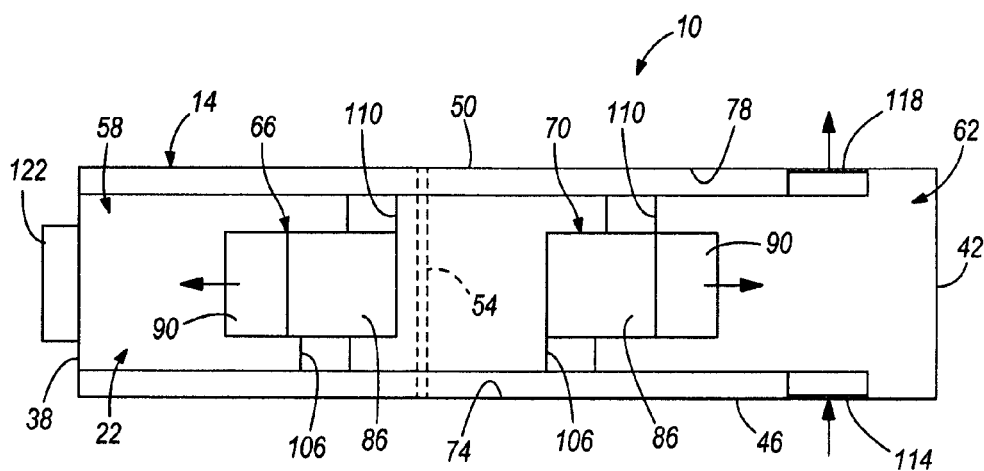
FIG. 2 is a top cross-sectional view of the trailer shown in FIG. 1.

FIGS. 1 and 2 illustrate a trailer 10 according to an embodiment of the invention. In the illustrated embodiment, the trailer 10 includes a container 14, wheels 18 coupled to the container 14 to facilitate movement of the trailer 10, and a distributed refrigeration system 22 operable to cool the container 14. The illustrated trailer 10 is connectable to a semi-tractor (not shown) that is capable of towing the trailer 10. As shown in FIG. 1, the trailer 10 is detached from the tractor and supported on a strut 26. In other embodiments, the container 14 may be securely mounted directly to the tractor and may not be detachable.

The container 14 is configured to store cargo (e.g., food product or the like) at a reduced or refrigerated temperature. In some constructions, the container 14 may store cargo at an elevated or heated temperature. As shown in FIGS. 1 and 2, the container 14 includes a roof 30, a floor 34, a front wall 38, a rear wall 42, and opposing sidewalls 46, 50. The illustrated trailer 10 also includes a bulkhead 54 to divide the container 14 into front and rear portions 58, 62, or compartments. The bulkhead 54 facilitates cooling of the front and rear portions 58, 62 to substantially different temperatures such as, for example, a chilled temperature and a frozen temperature. In the illustrated embodiment, the bulkhead 54 is retractable or collapsible so the container 14 is not always divided into the front and rear portions 58, 62. In other embodiments, the container 14 may include two or more bulkheads to divide the container 14 into even more portions. In still other embodiments, the bulkhead 54 may be omitted entirely.

Figure 3:
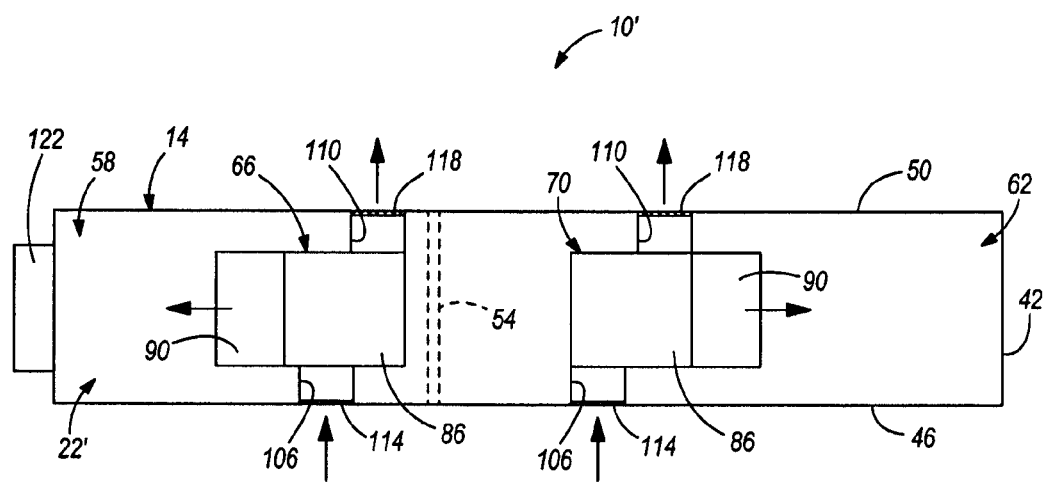
FIG. 3 is a top cross-sectional view of the trailer shown in FIG. 1 including another distributed refrigeration system.

Referring to FIG. 2, the distributed refrigeration system 22 includes a first refrigeration unit 66, a second refrigeration unit 70, a first duct 74, and a second duct 78. FIG. 3 illustrates another arrangement of a distributed refrigeration system 22' including the first and second refrigeration units 66, 70. The refrigeration systems 22, 22' are considered "distributed" in that the refrigeration units 66, 70 are spaced apart along the container 14 to facilitate uniform temperature distribution throughout the container 14. In some embodiments, the distributed refrigeration systems 22, 22' may include three or more refrigeration units depending on the size of the container 14, the desired temperature distribution, and/or the number of bulkheads 54. Additionally or alternatively, in other embodiments, the relative positions of the refrigeration units 66, 70 along the container 14 may be changed.

The illustrated refrigeration units 66, 70 are vapor compression units operable to condition (e.g., cool or heat) the container 14. Referring to FIG. 1, the first and second refrigeration units 66, 70 are coupled (e.g., bolted) to the roof 30 of the container 14 and suspended such that each refrigeration unit 66, 70 is positioned substantially within the container 14. In the illustrated embodiment, the roof 30 is thinned and filled with vacuum insulation and the refrigeration units 66, 70 are bolted to an inner surface of the roof 30 to provide a low profile construction. In such an arrangement, the refrigeration units 66, 70 are unobtrusively located (i.e., positioned above cargo within the container 14), allowing loading and unloading of the cargo from the container 14 with a reduced risk of damaging or blocking the units 66, 70, while not increasing the overall size of the trailer 10. In addition, positioning the refrigeration units 66, 70 proximate the roof 30 of the container 14 facilitates distributing refrigerated air, and thereby maintaining a uniform temperature, throughout the container 14.

In the illustrated embodiment, the first refrigeration unit 66 is positioned within the front portion 58 of the container 14 to condition the front portion 58 to a first temperature and the second refrigeration unit 70 is positioned within the rear portion 62 to condition the rear portion 62 to a second temperature. For example, the front portion 58 may be cooled to a frozen temperature (e.g., about minus 20° F. to about 0° F.) while the rear portion 62 may be cooled to a chilled temperature (e.g., about 35° F. to 38° F.), or vice versa. In some embodiments, the first and second temperatures may be substantially the same and/or the bulkhead 54 may be opened or removed such that the entire container 14 is conditioned to one temperature. In such embodiments, the refrigeration units 66, 70 help maintain the substantially uniform temperature distribution throughout the container 14 and reduce the load that would otherwise be applied to a single refrigeration unit.

Figure 4:
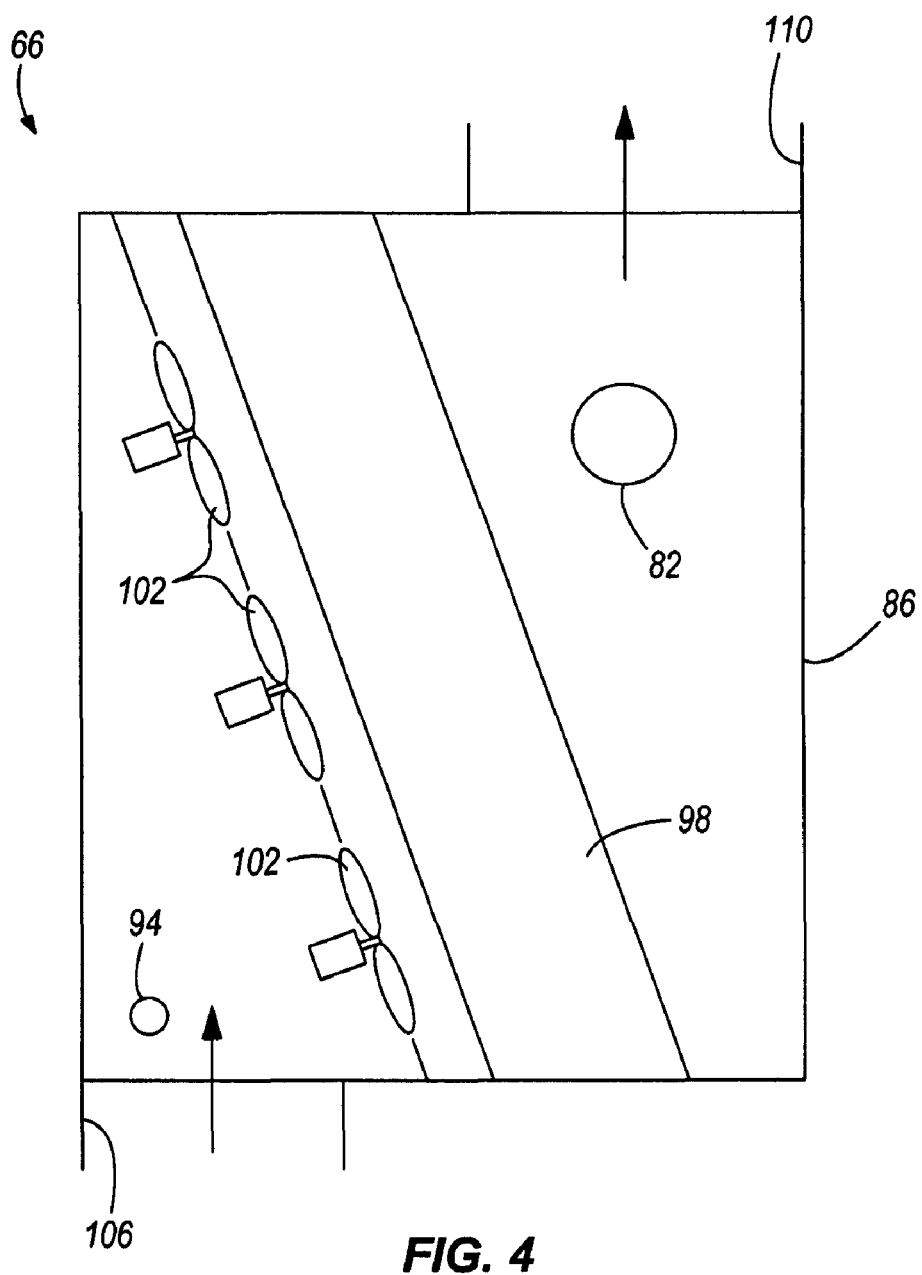
FIG. 4 is a schematic of a portion of a refrigeration unit of the distributed refrigeration systems shown in FIGS. 1 and 3.

As shown in FIG. 4, the first refrigeration unit 66 includes a compressor 82 (e.g., a hermetic compressor), a condenser unit 86, an evaporator 90 (FIG. 2), and a receiver 94. Similar to the roof 30, a casing of the refrigeration unit 66 may be filled or covered with vacuum insulation. Although only a portion of the first refrigeration unit 66 is illustrated in detail in FIG. 4 and described below, it should be readily apparent to one skilled in the art that both refrigeration units 66, 70 include substantially the same components and operate in a substantially similar manner. In addition, for clarity, not all of the components of the refrigeration unit 66 are shown in FIG. 4.

In the illustrated embodiment, the compressor 82 and the receiver 94 are positioned substantially within the condenser unit 86 and the evaporator 90 is positioned adjacent to the condenser unit 86. Such an arrangement makes the refrigeration unit 66 a generally self-contained unit that may be easily replaced and interchanged on the trailer 10. In frozen temperature applications, the compressor 82 may be a two-stage or multi-stage compressor.

The illustrated condenser unit 86 is positioned in fluid communication between the first duct 74 and the second duct 78 such that an airflow from the first duct 74 passes through the condenser unit 86 prior to reaching the second duct 78. As shown in FIG. 4, the condenser unit 86 includes a condenser coil 98 and a plurality of condenser fans 102, or blowers, operable to force the airflow through the first duct 74 and propel the airflow over the condenser coil 98 and into the second duct 78. In some embodiments, the compressor 82 may be surrounded by an insulating material to help thermally separate the compressor 82 from the condenser coil 98.

Figure 5:
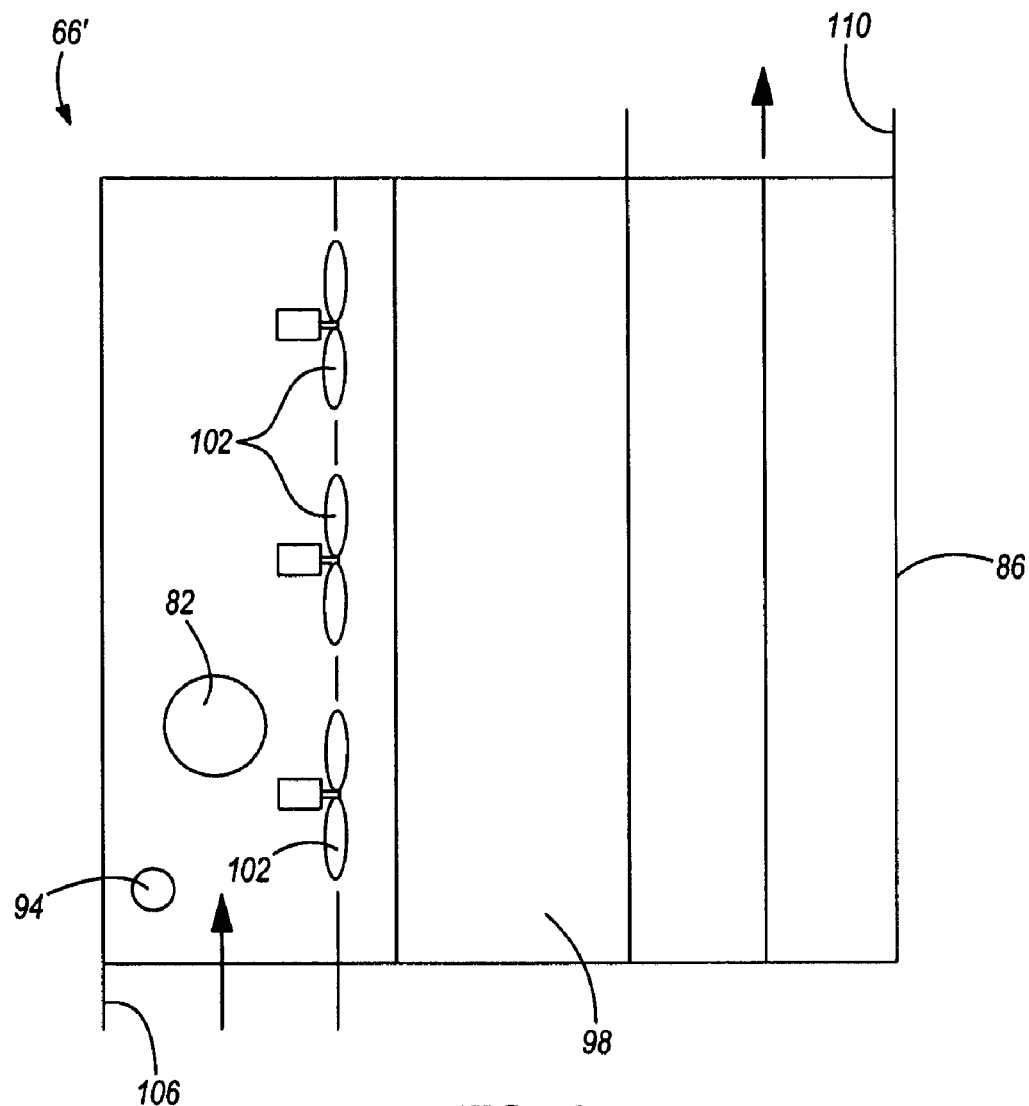
FIG. 5 is a schematic of a portion of another refrigeration unit of the distributed refrigeration system shown in FIGS. 1 and 3.

FIG. 5 illustrates an alternative construction of a first refrigeration unit 66'. The illustrated first refrigeration unit 66' includes substantially the same components as the first refrigeration unit 66 of FIG. 4, and like parts have been given the same reference numbers. In the embodiment of FIG. 5, the relative positions of the components are changed compared to the positions of the components shown in FIG. 4, but the refrigeration unit 66' still functions in substantially the same manner as the refrigeration unit 66.

Referring to FIG. 2, the first duct 74 extends along a portion of the first sidewall 46 and the second duct 78 extends along a portion of the second sidewall 50. In other embodiments, the ducts 74, 78 may extend along a larger or smaller portion of the sidewalls 46, 50 than the amount illustrated. As shown in FIG. 1, the first and second ducts 74, 78 are mounted proximate to the roof 30 of the container 14 such that the ducts 74, 78 are generally aligned with the condenser units 86 of the refrigeration units 66, 70. In some embodiments, the condenser units 86 may be positioned relatively lower or higher (e.g., by partially cutting into the roof 30) inside the container 14. In such embodiments, the ducts 74, 78 may be positioned relatively lower or higher along the sidewalls 46, 50 to correspond with the alternative positions of the condenser units 86. In other embodiments, both ducts 74, 78 may extend along the same sidewall.

In the illustrated embodiment, the first and second ducts 74, 78 each include two duct portions 106, 110 that extend generally perpendicular relative to the sidewalls 46, 50. The illustrated first duct portions 106 direct the air flowing through the first duct 74 parallel to the first sidewall 46 to flow inwardly toward the refrigeration units 66, 70. The illustrated second duct portions 110 direct the air flowing outwardly from the refrigeration units 66, 70 to flow through the second duct 78 and parallel to the second sidewall 50. In some embodiments, the refrigeration units 66, 70 and the ducts 74, 78 are sized to be in direct communication without the duct portions 106, 110. In other embodiments, the duct portions 106, 110 may be lengthened or shortened depending upon the width of the container 14 and the size of the refrigeration units 66, 70.

The illustrated ducts 74, 78 and duct portions 106, 110 are insulated (e.g., with vacuum insulation) to help inhibit heat transfer between the refrigerated air in the container 14 and the airflow in the ducts 74, 78. In some embodiments, the ducts 74, 78 may be separate components that are detachable from the container 14. In other embodiments, the ducts 74, 78 may be integrally formed as a single piece with the sidewalls 46, 50 and/or the roof 30 of the container 14.

The first sidewall 46 includes an intake opening 114 that allows fresh ambient air from the surrounding environment to enter the first duct 74. In some embodiments, the intake opening 114 may include vents (not shown) configured to help divert ambient air into the first duct 74 while the trailer 10 is moving. The second sidewall 50 includes a discharge opening 118 to discharge the airflow from the second duct 78 into the surrounding environment after it passes through the condenser units 86. In some embodiments, the discharge opening 118 may include vents (not shown) configured to substantially inhibit ambient air from entering the second duct 78 while the trailer 10 is moving. Additionally or alternatively, the intake and discharge openings 114, 118 may be replaced by a plurality of smaller openings extending along the lengths of the sidewalls 46, 50.

As shown in FIG. 2, the openings 114, 118 are generally aligned with each other on the opposing sidewalls 46, 50 near the rear wall 42. In other embodiments, the openings 114, 118 may be staggered along the sidewalls 46, 50 or may be positioned in substantially different locations (e.g., adjacent to or in the front wall 38). For example, one of the openings 114, 118 could be positioned at the front of its respective sidewall 46, 50 while the other opening 114, 118 could be positioned at the rear of its respective sidewall 46, 50. In still other embodiments, at least one of the openings 114, 118 could be positioned on the roof 30 to allow venting through the roof 30. However, positioning the openings 114, 118 along the sidewalls 46, 50 (as opposed to the roof 30) inhibits dirt, leaves, snow, or other debris from blocking the ducts 74, 78 and, thereby, restricting airflow into and/or out of the refrigeration system 22.

In the distributed refrigeration system 22' shown in FIG. 3, the duct portions 106, 110 are in direct communication between the openings 114, 118 and the refrigeration units 66, 70. Such an arrangement reduces the amount of space used by the distributed refrigeration system 22' and eliminates heat transfer between air in the ducts 74, 78 and air in the container 14.

The illustrated trailer 10 also includes a power source 122 (e.g., a diesel generator, an alternator, a fuel cell, a high capacity storage battery, or the like) coupled to the container 14 to supply power to the refrigeration units 66, 70. As shown in FIG. 1, the power source 122 may be mounted to the front wall 38 of the container 14 or alternatively to the floor 34 of the container 14. In other embodiments, the power source 122 may be mounted in still other locations on the trailer 10. In constructions where the power source 122 is a generator, a fuel tank 126 (e.g., a diesel fuel tank) is coupled to the trailer 10 to supply fuel to the generator. In constructions where the power source 122 is an alternator, the alternator can be coupled to the engine of the truck to convert energy from the engine into electricity. In some embodiments, the trailer 10 may include a provision such that the refrigeration units 66, 70 may be plugged into a wall outlet or secondary generator that is not part of the trailer 10 when the trailer 10 is disconnected from the tractor.

In operation, air from the environment is pulled and/or directed through the intake opening 114 and into the first duct 74 (or duct portions 106). The first duct 74 directs the airflow into the condenser units 86 of the first and second refrigeration units 66, 70. At substantially the same time, the compressor 82 of each refrigeration unit 66, 70 compresses a gaseous refrigerant and directs the compressed refrigerant through the condenser coils 98. The condenser fans 102 direct the airflow over the condenser coils 98 to cool and condense the compressed refrigerant into a liquid refrigerant that is directed to and temporarily stored in the corresponding receivers 94.

After passing over the condenser coils 102, the airflow is directed into the second duct 78 (or duct portions 110) and away from the refrigeration units 66, 70. The air flows through the second duct 78 toward the discharge opening 118 and is discharged back into the environment.

Meanwhile, the liquid refrigerant flows out of each receiver 94 and is directed to the corresponding evaporators 90. The liquid refrigerant is forced through corresponding expansion valves (not shown) that converts the refrigerant into a two-phase fluid. The expansion valves are generally located in the evaporators 90, although the expansion valves may alternatively be positioned in the condenser units 86. The two-phase refrigerant absorbs heat from air in the container 14 being directed through the evaporators 90. The refrigerant generally leaves the evaporators 90 in a superheated condition and is routed back to the compressors 82 for recycling. The cooled air exiting each evaporator 90 is directed back into the container 14, where it will remove heat from the cargo and maintain the cargo at the desired refrigerated or freezing temperature.

Figure 6:
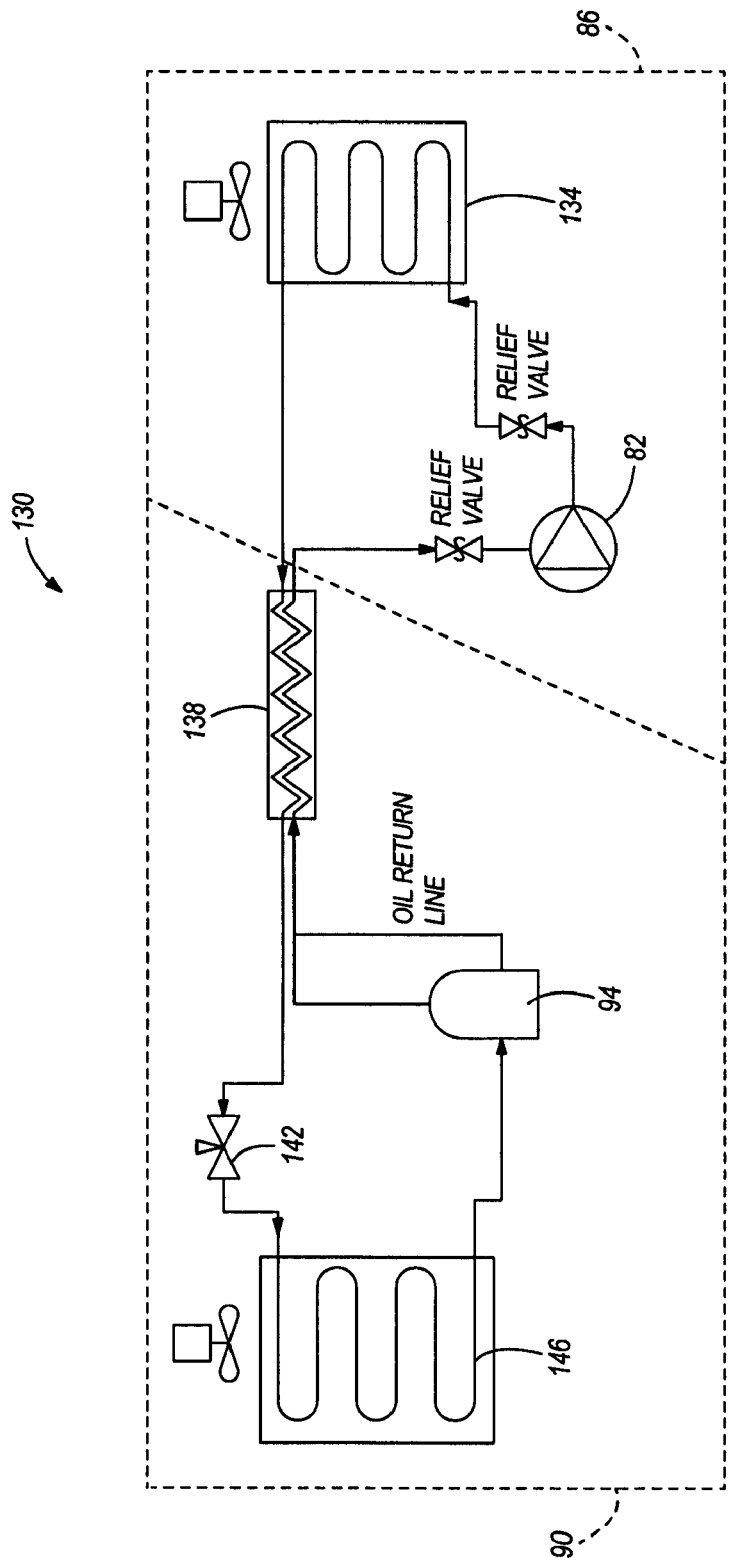
FIG. 6 is a schematic of a transcritical closed cycle $CO_2$ refrigeration system.

In some embodiments, the refrigeration units 66, 70 may be transcritical closed cycle $CO_2$ refrigeration units instead of vapor compression units. FIG. 6 illustrates a transcritical closed cycle $CO_2$ refrigeration system 130. The $CO_2$ refrigeration system 130 operates in a similar fashion to the vapor compression units, except the vapor $CO_2$ refrigerant is compressed to a pressure above the thermodynamic critical point of the $CO_2$ refrigerant. Consequently, when heat is rejected in a gas cooler 134 (previously called the condenser), vapor $CO_2$ refrigerant is cooled but does not change phase to a liquid. The cooled, high-pressure vapor $CO_2$ refrigerant is then passed through a heat exchanger 138 and throttled by an expansion device 142 where, similar to the vapor compression units, the low-pressure vapor $CO_2$ refrigerant changes phase to a liquid-vapor mixture and boils to a vapor in an evaporator coil 146.

Distributed refrigeration systems improve temperature distribution in trailers by spacing multiple refrigeration units throughout the trailers. As such, distributed refrigeration systems do not require air circulation systems to evenly distribute refrigerated air, decreasing power consumption by extra fans and improving the overall system efficiency. Having multiple refrigeration units within a container also increases the cooling capacity and provides redundancy if one of the refrigeration units happens to fail.

In addition, distributed refrigeration systems generally require fewer components than existing refrigeration systems. For example, the illustrated distributed refrigeration systems 22, 22' significantly reduce the amount of refrigerant piping and joints compared to prevailing systems, reducing the potential for refrigerant leaks. The illustrated distributed refrigeration systems 22, 22' may also utilize a hermetic compressor, which further reduces the potential for leaks.

Furthermore, distributed refrigeration systems typically have better thermodynamic efficiencies than secondary loop systems since the distributed refrigeration systems do not include extra heat exchangers.

Various features and advantages of the invention are set forth in the following claims.

What is claimed is:
1. A refrigeration system configured for use with a trailer including a container having a roof, a first sidewall, and a second sidewall, the refrigeration system comprising:
a refrigeration unit configured to couple to the trailer and operable to condition the container;

a first duct in fluid communication between the refrigeration unit and an opening in the first sidewall, the first duct configured to direct an airflow in a first direction toward the refrigeration unit; and a second duct in fluid communication between the refrigeration unit and an opening in the second sidewall, the second duct configured to direct the airflow in a second direction away from the refrigeration unit.

2. The refrigeration system of claim 1, wherein the refrigeration unit includes a condenser unit, and wherein at least one of the first duct and the second duct is in fluid communication with the condenser unit.

3. The refrigeration system of claim 1, wherein the refrigeration unit is configured to couple to the roof of the container and is configured to be positioned substantially within the container.

4. The refrigeration system of claim 1, wherein the refrigeration unit is a first refrigeration unit, and further comprising a second refrigeration unit configured to couple to the trailer and operable to condition the container, and wherein each of the first duct and the second duct is also in fluid communication with the second refrigeration unit.

5. The refrigeration system of claim 1, wherein at least one of the first duct and the second duct is configured to be positioned substantially within the container.

6. The refrigeration system of claim 1, wherein the refrigeration unit is a first refrigeration unit, and further comprising:
    a second refrigeration unit configured to couple to the trailer and operable to condition the container, wherein
    the second duct is in fluid communication between the second refrigeration unit and the opening in the second sidewall, the second duct configured to direct an airflow in direction away from the second refrigeration unit.

7. The refrigeration system of claim 6, wherein the trailer includes a bulkhead dividing the container into a first container portion and a second container portion, and wherein the first refrigeration unit is operable to condition the first container portion and the second refrigeration unit is operable to condition the second container portion.

8. The refrigeration system of claim 1, wherein at least a portion of the duct is insulated with vacuum insulation.

9. A trailer comprising:
    a container including a roof, a first sidewall, and a second sidewall;
    a refrigeration unit operable to condition the container;
    a first duct in fluid communication between the refrigeration unit and an opening in the first sidewall, the first duct configured to direct an airflow in a first direction toward the refrigeration unit; and
    a second duct in fluid communication between the refrigeration unit and an opening in the second sidewall, the second duct configured to direct the airflow in a second direction away from the refrigeration unit.

10. The trailer of claim 9, wherein the refrigeration unit includes a condenser unit, and wherein at least one of the first duct and the second duct is in fluid communication with the condenser unit.

11. The trailer of claim 9, wherein the refrigeration unit is coupled to the roof of the container and is positioned substantially within the container.

12. The trailer of claim 9, wherein the refrigeration unit is a first refrigeration unit, and further comprising a second refrigeration unit operable to condition the container, and wherein each of the first duct and the second duct is also in fluid communication with the second refrigeration unit.

13. The trailer of claim 9, wherein at least one of the first duct and the second duct is positioned substantially within the container.

14. The trailer of claim 9, wherein the refrigeration unit is a first refrigeration unit, and further comprising:
    a second refrigeration unit operable to condition the container, wherein
    the second duct is in fluid communication between the second refrigeration unit and the opening in the second sidewall, the second duct configured to direct an airflow in direction away from the second refrigeration unit.

15. The trailer of claim 14, wherein the trailer includes a bulkhead dividing the container into a first container portion and a second container portion, and wherein the first refrigeration unit is operable to condition the first container portion and the second refrigeration unit is operable to condition the second container portion.

16. The trailer of claim 9, wherein at least a portion of the duct is insulated with vacuum insulation.

17. A method of conditioning a trailer, the trailer including a container having a roof, a first sidewall, and a second sidewall, and a refrigeration unit, the method comprising:
    directing an airflow in a first direction toward the refrigeration unit with a first duct in fluid communication between the refrigeration unit and an opening in the first sidewall;
    conditioning the container with the refrigeration unit; and
    directing the airflow in a second direction away from the refrigeration unit with a second duct in fluid communication between the refrigeration unit and an opening in the second sidewall.

18. The method of claim 17, wherein the refrigeration unit includes a condenser unit, and wherein directing the airflow in the first direction toward the refrigeration unit includes directing the airflow through the condenser unit.

19. The method of claim 17, wherein the refrigeration unit is a first refrigeration unit and the trailer includes a second refrigeration unit, and further comprising:
    directing the airflow in the first direction toward the second refrigeration unit with the first duct,
    conditioning the container with the second refrigeration unit, and
    directing the airflow in the second direction away from the second refrigeration unit with the second duct.

20. The method of claim 19, wherein the trailer includes a bulkhead dividing the container into a first container portion and a second container portion, and wherein conditioning the container with the first refrigeration unit includes conditioning the first container portion with the first refrigeration unit, and wherein conditioning the container with the second refrigeration unit includes conditioning the second container portion with the second refrigeration unit.

* * * * *